Nov. 13, 1962 H. G. BRILMYER 3,063,148
CORE REMOVAL TOOL
Filed July 12, 1960
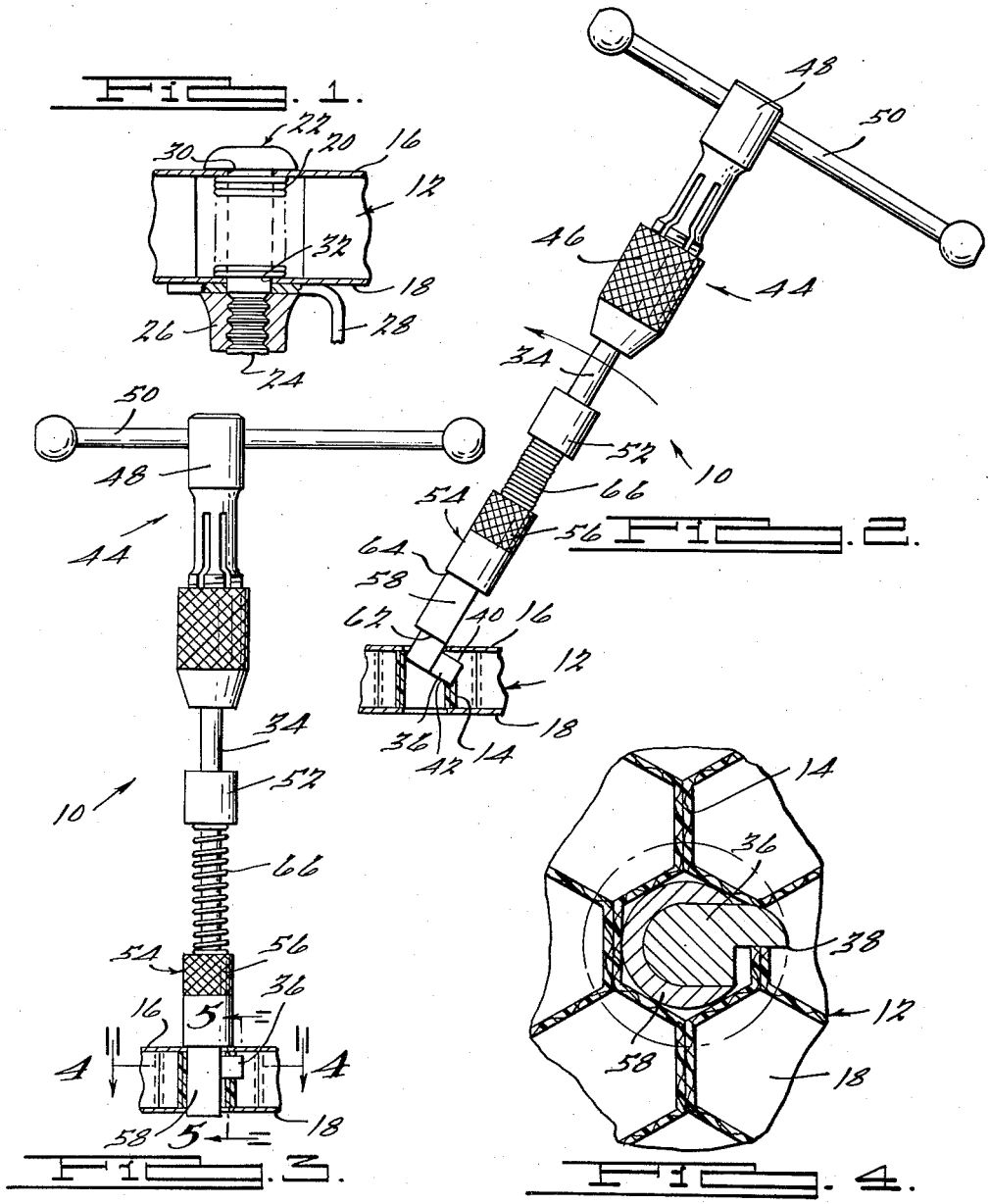
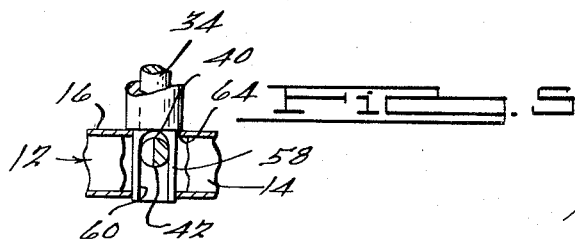
INVENTOR.
Harold G. Brilmyer
BY
Harness, Dickey & Pierce
ATTORNEYS.

United States Patent Office 3,063,148
Patented Nov. 13, 1962

3,063,148
CORE REMOVAL TOOL
Harold G. Brilmyer, Grosse Pointe, Mich., assignor to Huck Manufacturing Company, Detroit, Mich., a corporation of Michigan
Filed July 12, 1960, Ser. No. 42,327
2 Claims. (Cl. 30—276)

This invention relates generally to the art of securing fasteners to structural sandwiches of the type having relatively high strength skins or laminae spaced apart by a relatively weak core, and more particularly to an improved tool for removing selected portions of the core.

Fastening to structural sandwiches of this type presents a serious problem because the low strength stabilizing core cannot carry the fastening load and it is necessary to transfer the fastening loads to the high strength laminae to avoid distorting the core. Accordingly, it is necessary to assemble a spacer with the laminae such as the spacer disclosed in the application Serial No. 755,524, filed August 18, 1958, now abandoned, by Milo R. Simmons. In order to assemble such a spacer, a selected portion of the core material must be removed and it is an object of this invention to provide a core removal tool which is an improvement on the tool disclosed in the above application for this purpose. It is an object of this invention, therefore, to provide an improved tool of this type which includes a guide for the core cutter bar in the tool to confine the cutting movement of the cutter bar to planes substantially parallel to the laminae to thereby prevent gouging and damage to the internal surfaces of the laminae with the cutter bar.

A further object of this invention is to provide a core removal tool which includes improved means for mounting the tool on a structural sandwich to facilitate manipulation of the tool to remove selected portions of the core.

Further objects, features and advantages of this invention will become apparent from a consideration of the following description, the appended claims and the accompanying drawing in which:

FIGURE 1 is a sectional view of a structural sandwich having a spacer assembled therein and a fastener secured to the sandwich;

FIG. 2 is an elevational view of the core removal tool of this invention illustrating the tool in a position of initial assembly with a structural sandwich;

FIG. 3 is an elevational view of the core removal tool of this invention assembled with the sandwich and in position for removing a portion of the core material in the sandwich;

FIG. 4 is an enlarged sectional view looking along the line 4—4 in FIG. 3; and

FIG. 5 is a sectional view looking substantially along the line 5—5 in FIG. 3.

With reference to the drawing, the core removal tool of this invention, indicated generally at 10, is illustrated in FIG. 2, being assembled with a structural sandwich member 12 for removing some of the core material 14 from between spaced laminae 16 and 18 so that a spacer 20 (FIG. 1) can be inserted between the laminae. The spacer 20 enables the assembly of a fastener, such as the lockbolt 22 shown in FIG. 1 as consisting of a headed pin 24 and a collar 26 swaged onto one end of the pin 24, with the sandwich member 12 for attaching an angle 28 to the sandwich structure 12.

To assemble the fastener 22 with the sandwich member 12, a hole is first drilled through the sandwich member 12 so as to form aligned openings 30 and 32 in the laminae 16 and 18 of a diameter to accommodate the pin 24 in the fastener 22. Since the spacer 20 is of a greater outer diameter than the diameter of the openings 30 and 32, it is necessary to remove some of the core material surrounding the opening drilled through the material 14 in the formation of the openings 30 and 32. The tool 10 is operable to remove this core material.

The tool 10 consists of an elongated shaft 34 which is of a diameter less than the diameter of the openings 30 and 32 and which terminates at one end in a bit or blade 36 that extends substantially at right angles to the shaft 34. The blade 36 is formed at its outer end with a cutting edge 38 (FIG. 4) and along its top and bottom sides with cutting edges 40 and 42, respectively (FIG. 5). The diagonal distance across the lower end of the shaft 34 is slightly less than the diameter of the opening 30 to enable insertion of the blade 36 and the shaft 34 through the opening 30 as illustrated in FIG. 2.

The opposite end of the shaft 34 is provided with a handle assembly 44 which includes a knurled body 46 having an axial extension member 48 mounted thereon. A rod 50 is slidably mounted in and extends transversely through the member 48 to facilitate manual gripping of the handle assembly 44 to rotate the shaft 34. The knurled body 46 may, if desired, be removably connected to the end of the shaft 34 to enable the handle assembly 44 to be used as a part of a plurality of tools 10 of different sizes to remove core material from around openings 30 and 32 of different sizes.

A stop sleeve 52 is fixedly mounted on the shaft 34 intermediate the ends thereof. At a position between the sleeve 52 and the blade 36 and spaced from the sleeve 52, a shaft guide member 54 is slidably mounted on the shaft 34. The member 54 is provided at one end with an enlarged portion 56, some or all of the outer surface of which may be knurled, if desired, and at the opposite end with a tubular reduced diameter portion 58 which is of a diameter only slightly less than the diameter of the openings 30 and 32 and is of a length to extend through the sandwich structure 12. The portion 58 is formed with a longitudinally extending slot 60 which extends from the end 62 of the guide member 54 to a position adjacent the peripheral shoulder 64 formed on the guide member 54 at the juncture of the portion 58 with the portion 56. A spring 66 is positioned on the shaft 34 so that it extends between the sleeve 52 and the guide member 54 for urging the guide member 54 in a direction toward the cutter 36.

In the use of the tool 10, the guide member 54 is manually moved upwardly on the shaft 34 against the pressure of the spring 66 to the position illustrated in FIG. 2 and held in this position while the cutter blade 36 is inserted in the opening 30 as shown in FIG. 2 and the tool 10 is manipulated so that the shaft 34 is in coaxial alignment with the openings 30 and 32 in the sandwich structure 12. During such movement, the cutter blade 36 will be forced through the adjacent low density core material 14 as shown in FIGS. 2 and 4. The guide member 54 is then released so that the spring 66 will move the guide member 54 downwardly through the openings 30 and 32 to the position shown in FIG. 3 in which the shoulder 64 on the guide member 54 engages the near lamina 16. In this position of the tool 10, the shaft 34 and the guide member 54 are substantially perpendicular to the laminae 16 and 18 so that the cutting edges 40 and 42 on the cutter blade 36 are substantially parallel to the laminae 16 and 18. The handle assembly 44 is then manually gripped and rotated to rotate the shaft 34 which in turn rotates the cutter blade 36 and the cutter blade 36 in turn rotates the guide member 54 in the openings 30 and 32. The rotation of the cutter blade 36 is in planes substantially parallel to the laminae 16 and 18 so that the cutting edges 38, 40 and 42 will not gouge or otherwise damage the internal surfaces of the laminae 16 and 18. During each rotation of the handle assembly 44, the blade 36 clears a path in the core material 14 of a width equal to the width of the cutter blade 36. The handle assembly 44 is moved up and down to in turn move the cutter blade 36 up and down to extend the width of this path to a width corresponding to the distance between the laminae 16 and 18. Consequently, all of the core material surrounding the opening drilled therethrough which can be reached by the cutter bar 36 is quickly removed. Removal of this core material permits the assembly of the spacer 20 with the sandwich structure 12 with a tool like the one illustrated in the copending application of William N. Koeller, Serial No. 43,452, filed July 18, 1960.

When the removal of the core material 14 surrounding the drilled opening has been completed, the tool 10 is removed from the sandwich structure 12 by first grasping the guide member 54 and moving it upwardly on the shaft 34 until it is above the cutter blade 36. The tool 10 is then readily removed through the opening 32 by tilting the tool 10 in a reverse direction from that illustrated in FIG. 2. When desired, the guide member 54 can be rotated to move the slot 60 out of alignment with the cutter blade 36 for retaining the guide member 54 above the blade 36.

It will be understood that the specific construction of the improved core removal tool which is herein disclosed and described is presented for purposes of explanation and illustration and is not intended to indicate limits of the invention, the scope of which is defined by the following claims.

What is claimed is:

1. A tool comprising a tubular guide member adapted to positionally locate the tool between a pair of coaxially spaced apertures, a shaft extending coaxially of said guide member, and being slidably disposed within said guide member for axial movement therein and having one end extensible beyond said guide member, and a cutter member having cutting edges on its top, bottom, and outer sides and being rigidly secured to said shaft at said one end and extending radially outwardly through said guide member whereby rotation of said shaft is effective to move said cutter member through an annular path concentric with said guide member in the area between the spaced apertures, said top and bottom cutting edges extending in a direction normal to the axis of said shaft.

2. A tool comprising a tubular guide member having a reduced diameter portion adapted to positionally locate the guide member between a pair of coaxially spaced apertures and having a shoulder defined by the juncture of said reduced diameter portion and the adjacent portion of said guide member for supporting said guide member in the pair of spaced apertures, said guide member having an open slot formed in one side of said reduced diameter portion and extending longitudinally thereof, a shaft extending coaxially of said guide member and being slidably disposed within said guide member for axial movement therein and having one end extensible beyond said guide member, a cutter member having cutting edges on its top, bottom, and outer sides and being rigidly secured to said one end of said shaft and being movable axially within said slot and extending radially outwardly through said slot in said guide member whereby rotation of said shaft is effective to move said cutter member through an annular path concentric with the guide member in the area between the spaced apertures, a fixed stop on said shaft disposed intermediate said one end and the end of said shaft opposite said one end, said top and bottom cutting edges extending in a direction normal to the axis of said shaft, spring means extending between said stop and said guide member for urging said cutter member toward the closed end of said slot and means secured to said opposite end of said shaft for rotating said shaft References Cited in the file of this patent

UNITED STATES PATENTS

| | | |
|---|---|---|
| 892,676 | Mosteller | July 7, 1908 |
| 1,218,566 | Kawakubo | Mar. 6, 1917 |
| 1,386,249 | Gander | Aug. 2, 1921 |
| 1,455,797 | Mackensen | May 22, 1923 |
| 1,645,602 | Lewis | Oct. 18, 1927 |
| 2,105,707 | Stancliff | Jan. 18, 1938 |
| 2,314,084 | Fried | Mar. 16, 1943 |
| 2,365,648 | Rossman | Dec. 19, 1944 |
| 2,461,947 | Weber | Feb. 15, 1949 |
| 2,700,820 | Garduno | Feb. 1, 1955 |
| 2,869,404 | Condrac | Jan. 20, 1959 |
| 2,882,598 | Fidelman | Apr. 21, 1959 |

FOREIGN PATENTS

| | | |
|---|---|---|
| 24,878 | Great Britain | A.D. 1895 |